Inventors
Uno Lamm and
Algot Arvidsson
By
Attorney.

Patented July 6, 1954

2,683,225

UNITED STATES PATENT OFFICE 2,683,225

ELECTRIC LIGHTING FOR VEHICLES WITH STAND-BY POWER SUPPLY

Uno Lamm, Ludvika, and Algot Arvidsson, Saltsjobaden, Sweden, assignors to Allmanna Svenska Elektriska Aktiebolaget, Vasteras, Sweden, a Swedish corporation Application February 17, 1951, Serial No. 211,562

18 Claims. (Cl. 307—64)

Nowadays it is often desirable to use A. C. current for electric lighting of vehicles. The alternating voltage usually is supplied from a generator connected either to the motor of the vehicle, or to the wheel shaft or to a motor connected to an available voltage source. In all such vehicles, however, it must be taken in consideration that the alternating voltage—whatever power source may be used to generate the same—intermittently falls off, so that the power required for the load has to be taken from a battery reserve. In some cases the load may be supplied directly from the battery with direct voltage, but in those cases where the load requires alternating voltage an inverter must be interconnected between the battery and the load. For the charging of the battery a charging set is needed which has to be laid out so that the discharged battery is charged again as speedily as possible and that the charging conditions thereafter are maintained.

The present invention relates to a system for controlling the voltage applied to the load and for charging the battery in a system comprising one or more A. C. generators, driven from any power source, a reserve power set comprising a battery, and if desired an inverter for converting the D. C. power of the battery into A. C. power, and a charging set connected across the voltage of the generator. The external load, i. e. the lamps, is normally connected to the alternating voltage of the generator. Upon the disappearance or decrease of the ordinary alternating voltage the load is switched over to the reserve power set.

It is a principal feature of the present invention that the control system comprises two regulators for the load circuit and the charging circuit, respectively independent of each other, wherein the one influences the excitation of the A. C. generator whilst the other, constituting preferably a transductor operated regulator, is connectible to either of said circuits. In the case that the latter regulator is connected to the load circuit, the field regulator of the generator controls the voltage across the load in a desired manner, whilst the transductor operated regulator controls the charging of the battery. In the case that the said latter regulator is connected to the charging circuit, the field regulator of the generator controls the voltage in such a manner that a desired charging characteristic for the battery is obtained whilst the transductor operated regulator is connected in series with the load circuit and controls the voltage across the load circuit in desired manner.

Figure 1:
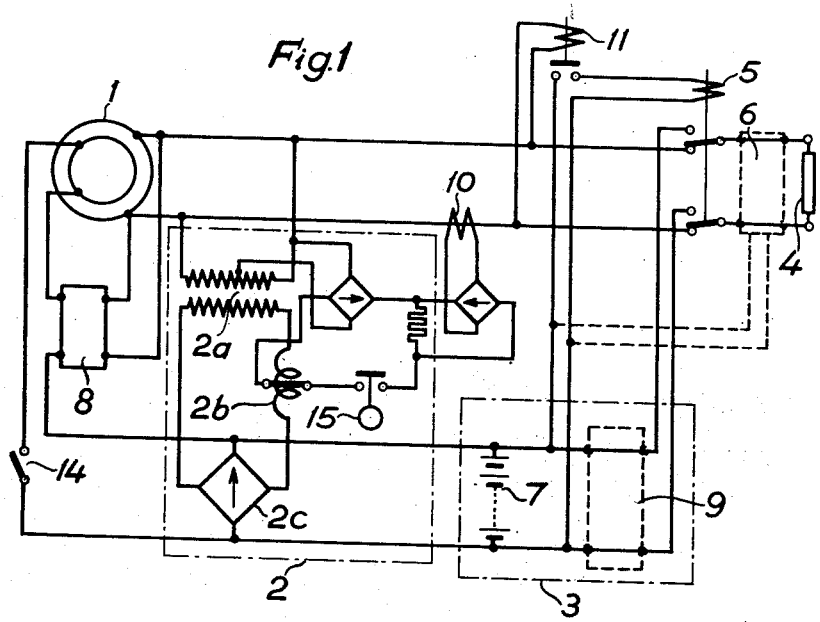
Figure 2:
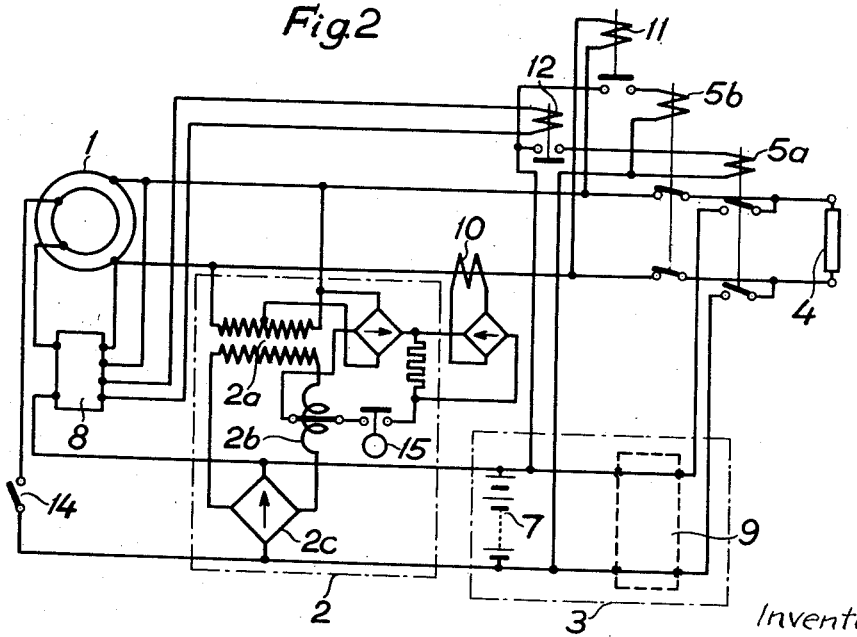
Figure 3:
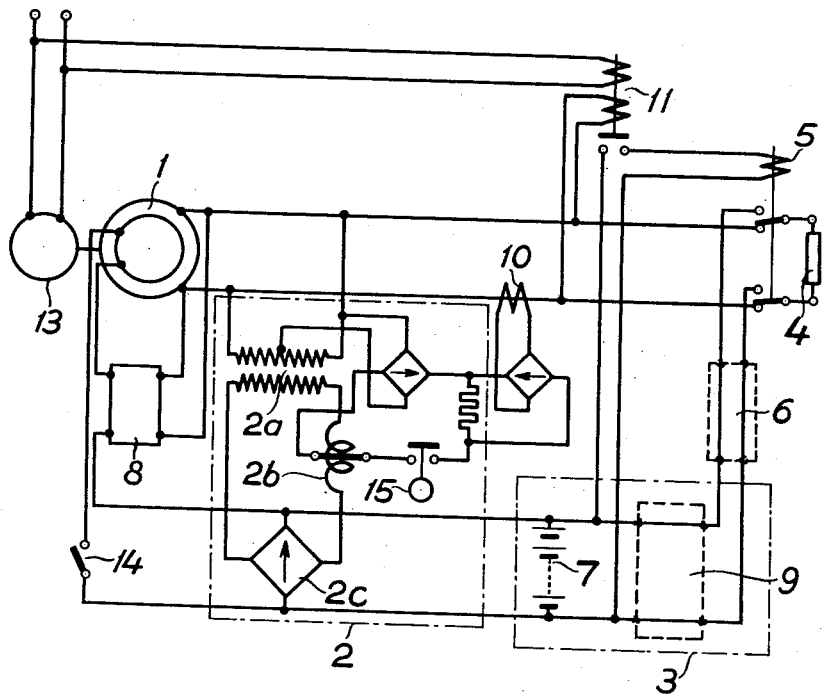

The invention will be described reference being had to the accompanying drawings wherein Figs. 1–3 show different examples of embodiments of systems in which the field generator controls the voltage across the load and the other regulator controls the charging of the battery.

Figure 4:
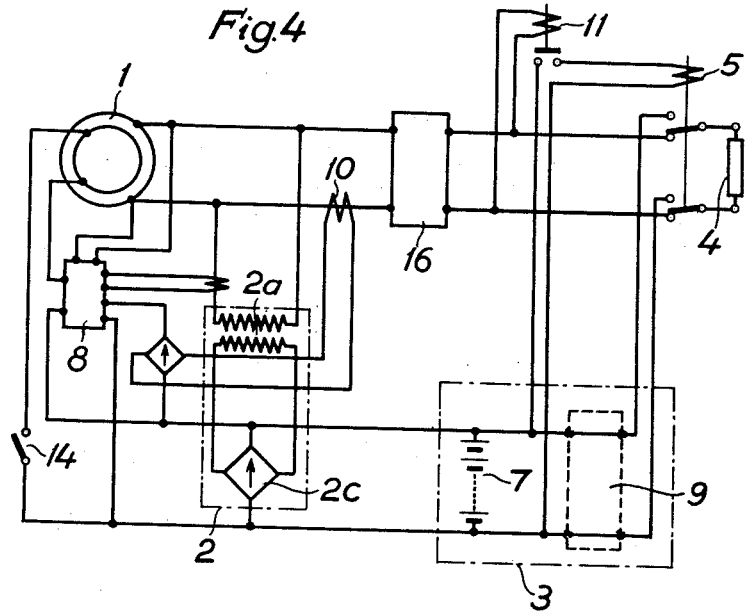
Figure 5:
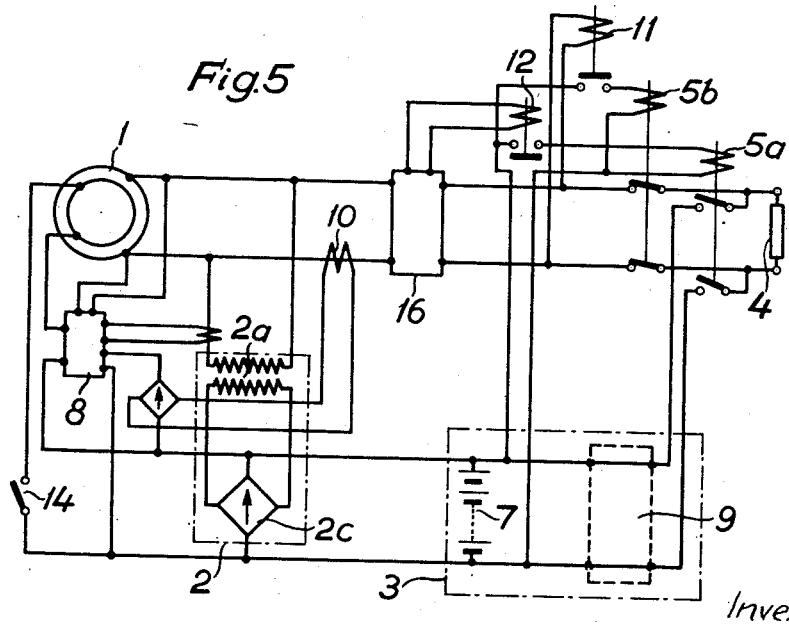

Figs. 4–5 show examples of embodiments, wherein the field regulator of the generator controls the voltage so that a desired charging characteristic for the battery is obtained, whilst the other regulator controls the voltage across the load circuit. Insofar as the same elements are utilized the reference characters are chosen alike.

Referring to the drawings, 1 designates an A. C. generator, 2 a charging set, 3 a reserve power set, and 4 the load. The generator may be laid out for arbitrary number of phases. For the sake of simplicity the generator and the wiring connections are indicated as single-phase on the drawings.

The load 4 is connected under normal conditions of operation across the voltage of the generator through a contactor 5. The generator is energized from the battery 7 and the exciting current is controlled by a voltage regulator 8, of transductor operated type, for instance, connected to the field circuit, which regulator controls the alternating voltage to a desired value. In the case that the load voltage is intended to be controlled by the field regulator 8 (Figs. 1–3) this regulator may be arranged so that it senses the charging condition of the battery (Figs. 4 and 5) and that it adjusts the alternating voltage in accordance therewith so that no variation of the intensity of illumination of the lamps will occur when the reserve power set is switched over to the battery reserve set.

The battery constituting said reserve power source, is connected to the charging set 2, which comprises suitably a transformer 2a, connected to the alternating voltage, and either a rectifier 2c controlled by a transductor 2b (Figs. 1–3) or only a rectifier 2c (Figs. 4 and 5). The charging rectifier 2c controlled by a transductor may be steered by a battery charging meter 15 as indicated in Figs. 1–3, or be controlled on constant voltage with automatic current limitation according to the so called "avostat" principle, i. e. a transductor operated control equipment whereinn the current A is limited to a certain maximum value whilst the voltage $V_0$ is held constant or "static." If the charging rectifier 2c is connected directly to the alternating voltage (if desired over a transformer 2a) (Figs. 4 and 5), the charging of the battery is controlled by the field regulator 8 of the generator, suitably according to the "avostat" principle. If the charging is controlled by a battery charging meter, the current through the charging rectifier, as the charging of the battery is accomplished, is adjusted to a value which corresponds to the necessary trickle charge of the battery and to that amount which is required for the excitation of the generator.

Between the battery 7 and the load there may be interconnected an inverter 9 of mechanical or static type, indicated by dotted lines on the drawings. If the inverter is of such a type that its output voltage depends directly on variations of the battery voltage, the power of the inverter is passed suitably through a voltage regulator 6, inserted between the inverter 9 and the load 4. If also the voltage delivered by the generator 1 requires a further regulation for obtaining the best lighting conditions, the voltage regulator 6 is connected as indicated in Fig. 1. If the regulation is only required on inverter operation, the regulator 6 is interconnected between the inverter 9 and the change-over which 5 as indicated in Fig. 3. In the operation of luminous electric discharge tubes it is sometimes of great importance to be able to control the operation current to any desired value, in which case the regulator 6 consists of a current regulator preferably of transductor type. Thus it is advantageous when the power for the illumination is taken from the battery reserve for a longer period of time, for instance when the vehicle stands still, to minimize the load current by means of said current regulator in order to save the battery. Especially in the use of luminous electric discharge tubes this can be performed without involving the risk of minimizing too much the intensity of illumination.

A current transformer 10 influences the control of the charging set in such a manner, that, if the current to the load circuit increases, this current which can be taken from the charging set 2 is limited so that the power supplied from the charging set, is limited to a minimum value before the limit of the load capacity of the generator is reached.

Indicated by 11 is a voltage relay which switches over the power from the generator to the power reserve set, when the voltage from the generator has fallen below a certain value. This relay closes a circuit in which a voltage relay for the operation of the change-over switch is interconnected (Figs. 1–4). In order to avoid this decrease of voltage which—though small—can be disturbing, a relay 12 as shown in Figs. 2 and 5 may be connected to the voltage regulator 8 of the generator or to the regulator 16 which controls the voltage across the load circuit in such a manner that this relay operates when the regulator approaches the limit of its ability of maintaining the alternating voltage of the generator.

In order to avoid interruption of the supply of alternating voltage to the load, which may occur on switching-over from the generator to the battery (with or without inverter) the switching over may be performed in two steps. If, for instance, the regulator 8 approaches the limit of its ability of maintaining the alternating voltage on predetermined value, the battery is connected in parallel to the generator by means of a contactor 5a. The generator then is disconnected by the released relay 11 a certain predetermined time after the battery has been switched in, by the contactor 5b the relay of which is provided with a delaying means, or since the alternating voltage has decreased below a certain value, or when the power flows from the battery (or inverter) towards the generator.

The Fig. 3 shows a modification, wherein the generator is driven by a motor 13 connected to any voltage source. In this case the relay 11 may be connected in such a manner, that it performs the switching over when the voltage either of the motor or of the generator decreases below a certain value. Inversely, the switching over from the reserve power set to the generator will not occur until both voltages have the proper value.

In the case that the field regulator of the generator carries out the control of the charging of the battery, a regulator 16 (Figs. 4 and 5) is interconnected between the generator and the load behind the point where the power is branched to the charging rectifier. This regulator controls the voltage or the current of the load circuit in desired manner.

If the switching-over from the generator circuit to the circuit of the reserve power set is effected by the system shown in Fig. 5, the switching operation is made through the relay 12, when the regulator 16 approaches the limit to maintain delivered current or voltage on desired values.

The arrangements work as follows:

When the generator is started, the contact 14 is closed so that the field of the generator 1 becomes energized, and when proper voltage occurs across the alternating current terminals of the generator to which the load has to be connected, the switching-over from the reserve power set to the generator is effected by means of any of the systems described above. As the battery has been subjected to discharge, the generator supplies power for charging the battery. The charging current is decreased automatically when the battery is fully charged. Should the power consumption of the load be considerable during the charging period, the charging current is limited in such a manner that the generator cannot be over-loaded due to the fact that the charging procedure occurs at the same time as the generator is loaded by the external load, i. e. with the lamps.

The switching over to the reserve power set is effected by means of the switch over relays and contactors mentioned above.

We claim as our invention:

1. An electric lighting system for vehicles comprising an alternating current lighting generator driven by a source of power and normally serving to supply the lighting power to the lamps, a battery reserve set serving to energize said generator and to incidentally supply lighting power, a load circuit, a charging circuit connected in parallel with the load circuit and serving to supply the charging power to said battery reserve set, a regulator for the load circuit, a regulator for the charging circuit, said regulators being independent of each other, a transductor operating one of said regulators, means connecting the transductor-operated regulator of one circuit in series with the other of said circuits, and means whereby the other regulator influences the excitation of the alternating current generator.

2. An electric lighting system for vehicles comprising an electric alternating current lighting generator driven by a source of power and normally serving to supply the lighting power to the lamps, a battery reserve set serving to energize said generator and to incidentally supply lighting power, a load circuit, a charging circuit connected in parallel with the load circuit and serving to supply the charging power to said battery reserve set, and switching-over means for alternately switching the generator or the battery reserve to the load circuit, regulators, one for the load circuit and one for the charging circuit, a transductor operating one of said regulators, means connecting the transductor-operated regulator of one circuit in series with the other of said circuits, and voltage depending means whereby the other regulator influences the excitation of the alternating current generator.

3. Electric lighting system according to claim 2, characterized in that the excitation of the generator consists of a basic excitation component from the battery reserve set and of an excitation component for voltage regulation actuated by the field regulator of the generator.

4. Electric lighting system according to claim 3, characterized in that said field regulator is provided with voltage compensation derived from the alternating voltage of the generator to cause the alternating voltage to increase as the frequency increases.

5. Electric lighting system according to claim 4, characterized in that said field regulator is provided with means for sensing the voltage across the battery reserve set and the load current, for adjusting the voltage of the generator so that substantially the same voltage is obtained before and after transition from generator operation to battery operation.

6. Electric lighting system for vehicles having an alternating current generator driven by a motor connected to a voltage source, according to claim 5, characterized by the provision of a relay for the changing over from the alternating voltage of the generator to the voltage of the battery reserve set when the supplying alternating voltage falls off and for changing over from battery operation to generator operation not until the voltage of the driving motor has been connected to the load circuit and the alternating voltage has reached a value suitable for the operation of the system.

7. Electric lighting system according to claim 6, characterized in that the relay which effects the changing over operation between the alternating voltage of the generator and the voltage of the battery reserve set is actuated when said field regulator approaches the limit of its ability to maintain the generator voltage on desired value.

8. Electric lighting system according to claim 7, characterized in that between the battery and the load is interconnected an electric inverter set.

9. Electric lighting system according to claim 8, characterized by delaying means for delaying the interruption of the generator voltage until the power of the battery reserve set is controlled to the proper value so that the power may be switched over without discontinuity.

10. Electric lighting system according to claim 9, characterized by means enabling the battery reserve set to be connected in parallel with the generator to the load circuit, as the field regulator approaches the limit of its ability to maintain the generator voltage, or as said voltage decreases to a certain value, and by means enabling the generator to be disconnected as the regulator has reached the said limit or as the generator voltage has decreased to a certain value lower than the first mentioned value or as the flow of energy occurs from the battery reserve to either of the voltage supplying sources.

11. Electric lighting system according to claim 10, characterized in that the charging set comprises a transductor operated rectifier and means for reducing the charging current to the value required for trickle charge as the battery is fully charged.

12. Electric lighting system according to claim 11, characterized in that the charging set is a transductor controlled for constant voltage and provided with means for limiting the charging current to a value allowed for the battery and the charging set.

13. Electric lighting system according to claim 12, characterized by means for limiting the power taken from the charging set so that said power and the power consumed in the load circuit do not exceed above a value allowed for the alternating current source.

14. Electric lighting system according to claim 13, characterized by a voltage regulator connected in series with the load circuit for holding constant the voltage across the load circuit independent of the voltage occurring across the alternating current source and across the battery, respectively.

15. Electric lighting system according to claim 14, characterized in that said voltage regulator is interconnected between the battery reserve set and the changing over switch for switching over the power from the generator to the battery reserve set.

16. Electric lighting system according to claim 15, characterized by a current regulator for controlling the current to the load circuit to any desired value, said current regulator being interconnected in series with at least a part of the load circuit and consisting of the transductor operated type, controlled by the voltage across the battery reserve set.

17. Electric lighting system for vehicles comprising an alternating current generator driven by some power source, a battery reserve set, a load circuit and a charging circuit connected in parallel with the load circuit, regulators for the load circuit and for the charging circuit, and a transductor operating one of said regulators, the regulator influencing the excitation of the generator being adapted to control the charging current for the battery reserve set, and the transductor operated regulator being connected in series with the load circuit being adapted to control the voltage across the load circuit to any desired value.

18. Electric lighting system according to claim 17, characterized in that said transductor operated regulator is adapted to control the voltage across and the current to the load circuit to any desired value.

No references cited.